United States Patent

[11] 3,569,779

[72] Inventor Meerten Luursema
 Emmasingel, Eindhoven, Netherlands
[21] Appl. No. 786,297
[22] Filed Dec. 23, 1968
[45] Patented Mar. 9, 1971
[73] Assignee U.S. Philips Corporation
 New York, N.Y.

[54] HIGH VOLTAGE POWER SUPPLY FOR A FLASH DISCHARGE LAMP
 10 Claims, 2 Drawing Figs.
[52] U.S. Cl............................................. 315/183,
 307/150, 315/241, 320/1, 321/2
[51] Int. Cl....................................... H02m 3/28,
 H05b 41/22, H05b 41/32
[50] Field of Search.......................... 315/241
 (P), 241 (S), 158, 183, 241; 320/1; 307/150;
 321/2

[56] References Cited
UNITED STATES PATENTS
3,127,551 3/1964 Lingle ........................ 320X/1
3,229,158 1/1966 Jensen ......................... 315/158
3,248,605 4/1966 Tomkinson ................... 315/241
3,310,723 3/1967 Schmidt et al. ............... 320/1
3,316,445 4/1967 Ahrons ........................ 315/183

Primary Examiner—Roy Lake
Assistant Examiner—C. R. Campbell
Attorney—Frank R. Trifari ABSTRACT: A power supply for a flash discharge lamp includes a capacitor and a voltage divider in parallel. A gas discharge tube is in parallel with a first part of the voltage divider and a controlled switching element is in parallel with a second part thereof. The gas tube is connected to the switching element so that at a given voltage across the capacitor, the gas tube ignites and causes the switching element to change state. This in turn abruptly alters the voltage distribution across the voltage divider in a sense to reduce the voltage across the gas tube to a level close to its operating voltage. The charge current to the capacitor is then interrupted. A relatively small discharge of the capacitor causes the gas tube to turn off, thereby allowing the capacitor charge current to flow again. The capacitor voltage variation is thus held within a narrow range.

INVENTOR.
MEERTEN LUURSEMA

BY

*Frank R. ...*

AGENT

HIGH VOLTAGE POWER SUPPLY FOR A FLASH DISCHARGE LAMP

The present invention relates to a circuit arrangement for igniting and supplying a flash discharge lamp. An arrangement of this type generally includes a capacitor which supplies the current during the flash of the lamp, which a capacitor is shunted by a potential divider. A circuit including a breakdown element forms a shunt across a part $a$ of the potential divider. The capacitor is charged in the nonconducting condition of the breakdown element and when the capacitor reaches a comparatively high voltage, said breakdown element begins to conduct and remains conducting for some time at a voltage which is smaller than its breakdown voltage. The current supply to the capacitor is cut off in the conducting condition of the breakdown element.

Such a circuit arrangement has the advantage that an energy source for a flash discharge lamp is obtained in a simple manner. A further advantage is that the losses which may arise when supplying the main capacitor may be very small.

A drawback of a known circuit arrangement of the kind described is, however, that the ratio between the upper limit of the voltage of the main capacitor and the lower limit thereof is rather large. This drawback becomes manifest, inter alia, in the following manner. If a flashlight photograph is taken at the instant that the capacitor voltage is at a maximum value, the object to be photographed is strongly illuminated. If, however, the photograph is taken at the instant of minimum capacitor voltage, the object receives considerably less illumination. Thus, in this method there is the risk that the exposure of the object will not be satisfactory. It is true that solutions have been considered, in circuit arrangements of the kind described in the preamble, in which auxiliary arrangements are provided in order to diminish the ratio between the upper limit voltage of the capacitor and the lower limit voltage. A drawback of these auxiliary arrangements is, however, their great complication.

It is an object of the invention to obviate or at least to mitigate the foregoing drawback.

A circuit arrangement according to the invention for igniting and supplying a flash discharge lamp includes a capacitor which supplies the current during the flash of the lamp. This capacitor is shunted by a potential divider. A circuit including at least a breakdown element forms a shunt across a part $a$ of the potential divider. The capacitor is charged when the breakdown element is in a nonconducting condition, and when the capacitor reaches a comparatively high voltage said element begins to conduct. The breakdown element continues to conduct for some time at a voltage which is smaller than its breakdown voltage. The current supply of the capacitor in the conducting condition of the breakdown element is cut off. The circuit is characterized in that a part $b$ of the potential divider is shunted by a circuit which includes a controlled semiconductor switching element, a control electrode of said semiconductor switching element being connected to the circuit including the breakdown element so that a voltage is generated at the control electrode by means of the circuit including the breakdown element. This voltage renders the semiconductor switching element conducting at every other conducting condition of the breakdown element. The condition that the conducting state of the switching element differs substantially at any instant from the conducting state of the breakdown element is satisfied if the breakdown element is in series with a main electrode circuit of the switching element, and the condition that the conducting state of the switching element is substantially always the same as the conducting state of the breakdown element is satisfied for all other cases.

An advantage of a circuit arrangement according to the invention is that the auxiliary arrangement for obtaining a comparatively small difference between the upper limit of the capacitor voltage and the lower limit of the capacitor voltage may be very simple.

In addition the elements of the auxiliary arrangement need not be reactive elements. In fact, it may be sufficient to use resistors. This has the advantage that the circuit is independent of the time constants of the auxiliary arrangement.

The present invention is actually based on the automatic variation of the potential divider of the main capacitor, which variation is brought about by a current flowing through the breakdown element. The breakdown element may be, for example, a glow discharge lamp. It may, however, alternatively be, for example, a diac (that is a bidirectional threshold element).

The semiconductor switching element may be, for example, a transistor. It is also feasible that, for example, a thyristor, a triac (that is a bidirectional controlled semiconductor circuit element having a double-sided thyristor characteristic) or a further semiconductor switching element may be used as the switching element.

The semiconductor switching element is preferably a transistor in which the control electrode (base) is included in the circuit of the breakdown element which shunts the part $a$ of the potential divider.

An advantage of this solution is that the auxiliary arrangement for obtaining a narrow voltage interval of the main capacitor can now become very simple because the connection from the circuit of the breakdown element to the circuit of the switching element may now perform a dual function. This function is both conveying the current for the breakdown element and controlling the transistor.

It is possible that the semiconductor switching element together with other circuit elements forms the shunt which shunts the part $b$ of the potential divider.

The semiconductor switching element is preferably the only circuit element in the shunt which shunts the part $b$ of the potential divider. An advantage of this preferred solution is that no additional resistors are required in addition to the element of the potential divider. In this case the semiconductor switching element, in its conducting condition, short circuits the part $b$ of the potential divider.

In order that the invention may be readily carried into effect it will now be described in detail, by way of example, with reference to the accompanying diagrammatic drawing, in which.

Figure 1:
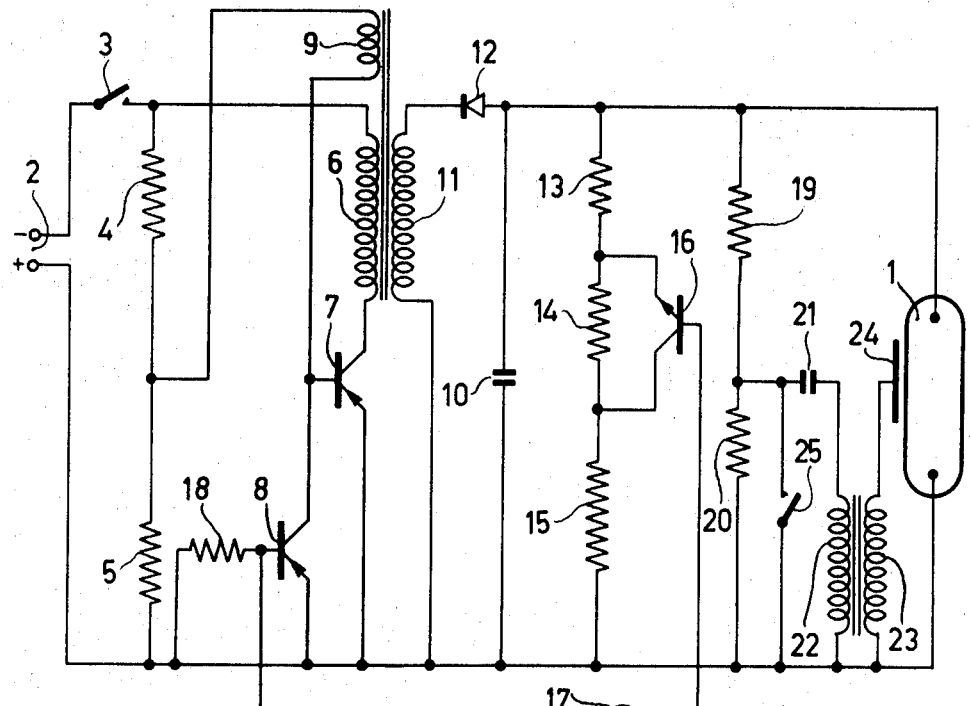
FIG. 1 shows a device for igniting and supplying a flash discharge lamp.

In FIG. 1 a flash discharge lamp is indicated by reference numeral 1. A DC source of approximately 6 Volts is indicated by reference numeral 2. One of the terminals (the negative terminal) of the DC source 2 is connected through a switch 3 to the series arrangement of two resistors (4,5). The other side of the resistor 5 is connected to the other terminal (the positive terminal) of the DC source 2. The connection branch from the switch 3 to the resistor 4 is connected to one end of the primary winding 6 of a transformer. The other end of this transformer winding 6 is connected to the collector of a transistor 7. The emitter of the transistor 7 is connected both to the emitter of a transistor 8 and to the positive terminal of the DC current source 2. The collector of transistor 8 is connected to the base of transistor 7 and, through an auxiliary winding 9 of the previously mentioned transformer, to the connection between resistor 4 and resistor 5. The circuit described represents a converter by means of which a voltage of high value is generated with which a main capacitor 10 is charged. This is effected through a secondary winding 11 of the transformer. One end of this transformer winding 11 is connected both to the emitter of the transistor 7 and to one of the electrodes of the capacitor 10. The other electrode of the capacitor 10 is connected through a rectifier 12 to the other end of the secondary winding 11.

The capacitor 10 is shunted by a potential divider consisting of the series arrangement of three resistors (13 to 15). The middle resistor 14 is shunted by a circuit of which the collector and emitter of a transistor 16 form part. The base of transistor 16 is connected through a glow-discharge lamp 17 to the base of transistor 8. This base is connected through a resistor 18 to the positive terminal of the voltage source 2. Finally, the main capacitor 10 is shunted by a second potential divider consisting of a series arrangement of two resistors 19 and 20. The flash discharge lamp 1 is connected across the series arrangement of the resistors 19 and 20. In addition the resistor 20 is shunted by a series arrangement of a capacitor 21 and the primary winding of an ignition transformer 22. The secondary winding 23 of this transformer is connected to an auxiliary electrode 24 of the flash discharge lamp 1. Resistor 20 is shunted by a flash-contact 25 of the camera.

The operation of this circuit arrangement in broad outline is as follows:

A current flows from the positive terminal of the voltage source 2 through the emitter collector junction of transistor 7 and subsequently through the primary winding 6 of the transformer. This occurs in the closed condition switch 3. Due to the operation of the winding 9 this current becomes zero again after some time, whereafter a current starts to flow in the secondary 11 of the transformer in a direction as shown by the pass direction of rectifier 12. This current charges the main capacitor 10. When the capacitor 10 reaches a given high voltage value, the glow-discharge lamp 17 breaks down. As a result transistor 8 begins to conduct. The converter stops oscillating because the base-emitter junction of transistor 7 is then short-circuited by the transistor 8. The voltage across the main capacitor 10 now decreases until the glow-discharge lamp 17 is extinguished, whereupon the oscillator starts to operate again and thereby increases the voltage across the capacitor. At the instant when the glow-discharge lamp 17 conducts the transistor 16 short circuits the resistor 14. The potential divider 13, 14, 15 is then changed into a potential divider 13, 15.

In one embodiment of the device: the resistor 13 was approximately 100 k. ohms; the resistor 14 was approximately 35 k. ohms; and the resistor 15 was approximately 65 k. ohms. The ignition voltage of the glow-discharge lamp 17 was approximately 128 Volts, and the operating voltage of the glow-discharge lamp 17 was approximately 100 Volts. In the circuit of FIG. 1 the maximum voltage of the capacitor 10 then was approximately 260 Volts and the minimum voltage of this capacitor was approximately 255 Volts. This voltage interval is thus very narrow.

Prior to the present invention the glow-discharge lamp 17 was also incorporated in a circuit which shunted the resistors 14 and 15 together, but the resistor 14 was then not short circuited. In this prior case the extreme values of the voltages of the capacitor 10 were approximately 260 Volts and 200 Volts. This voltage interval thus was considerably larger than in the case where the circuit arrangement according to the present invention was used.

When the flash-contact 25 (see FIG. 1) is closed, the voltage generated through the windings 22 and 23 is applied to the auxiliary electrode 24 which ignites the flash-discharge lamp 1. Since the voltage across the main capacitor 10 is now maintained within narrow limits, the quality of the exposure will always be substantially constant.

It is feasible in practice to make one or more of the resistors of the potential divider variable in order to adjust the voltage interval of the main capacitor 10 to a desired value.

In FIG. 1 the part $a$ of the potential divider is formed by the resistors 14 and 15 combined. The part $b$ is formed by the resistor 14 only.

Figure 2:
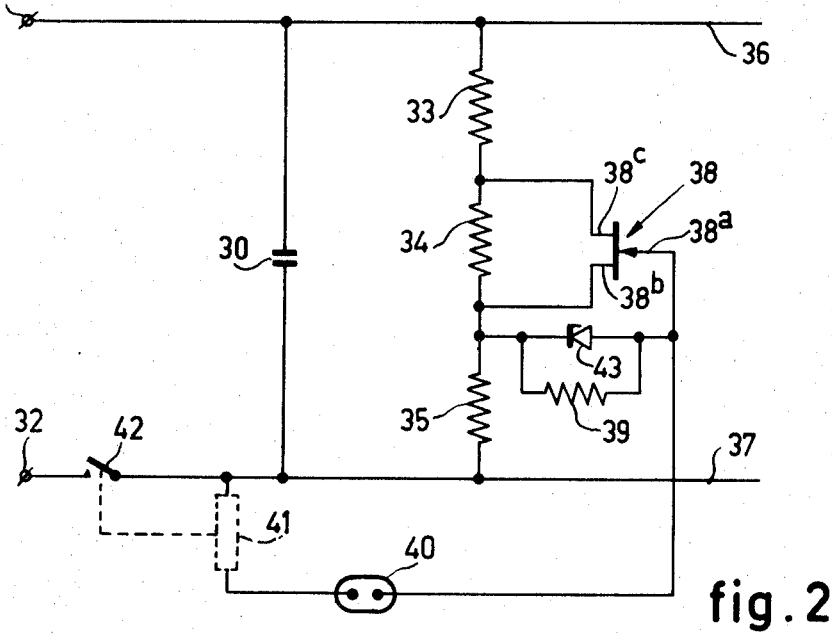
FIG. 2 shows an auxiliary part of a second device for igniting and supplying a flash discharge lamp.

In FIG. 2 a main capacitor is indicated by reference numeral 30. The main capacitor 30 is comparable to the capacitor 10 of FIG. 1. The main capacitor 30 is energized through the connection terminals 31 and 32 by a DC supply circuit, now shown, for example, a converter (compare FIG. 1) or a different energy source. Terminal 31 is the positive terminal. The main capacitor 30 is shunted by a potential divider consisting of a series arrangement of three resistors (33 to 35). The wires 36 and 37 connected to the ends of the potential divider lead to a flash discharge lamp arrangement, not shown, for example, as shown in FIG. 1 by elements 19 to 25 and lamp 1. The resistor 34 of the potential divider is shunted in this case by a circuit which includes the main electrodes of a transistor 38. Transistor 38 is a transistor which has a high impedance in its normal operating range between the control electrode 38$a$ and the emitter 38$b$. This transistor furthermore has the property that it will conduct at a voltage of zero Volt between the control electrode and the emitter. This transistor is cut off by setting up a negative voltage at the control electrode relative to the emitter.

The connection branch of resistors 34 and 35 is connected through a resistor 39 to a glow-discharge lamp 40. The other electrode of the glow-discharge lamp 40 is connected through a control circuit 41 of a switch arrangement 42, not shown in detail, to the negative side of the capacitor 30. The switch arrangement 42 is provided in the supply circuit of the capacitor 30.

The junction point of the resistor 39 and the glow-discharge lamp 40 is connected to the control electrode 38$a$ of the transistor 38.

The resistor 39 is shunted by a Zener diode 43 which has a safeguarding function. If glow-discharge lamp 40 is ignited the Zener diode 43 limits the voltage between the emitter 38$b$ and the control electrode 38$a$ of the transistor 38 to a safe value.

In the described circuit of FIG. 2 the following takes place when the voltage across the capacitor 30 (through the terminals 31 and 32) has increased to a high value. At the high voltage the glow-discharge lamp 40 ignites. As a result the previously conducting transistor 38 will be cut off. The result thereof is that the voltage divider which consisted of resistors 33 and 35 prior to the ignition of the glow-discharge lamp 40 changes into resistors 33, 34, 35 after the ignition of the glow-discharge lamp. By connecting the additional resistor 34 in series with the glow-discharge lamp 40, the lamp 40 will thus be extinguished earlier so that in this case too the voltage interval of the main capacitor 30 is small.

In FIG. 2 the part $a$ of the potential divider is formed by the resistor 35 and the part $b$ is formed by the resistor 34.

In FIG. 2 the breakdown element (the glow-discharge lamp 40) is in series with the main electrode circuit (circuit through 38$c$ and 38$b$) of the transistor 38, namely through the resistor 39.

In FIG. 1, however, the glow-discharge lamp 17 was not in series with the main electrode circuit of the transistor 16.

In the devices both of FIG. 1 and FIG. 2, it is possible to maintain a small voltage variation across the capacitor, with the simple means shown. Thus the quality of the photographs is considerably improved.

I claim:

1. A circuit arrangement for flashing a flash discharge lamp comprising, a capacitor which supplies the current for flashing the lamp, a potential divider connected in shunt with the capacitor, circuit means including a voltage breakdown element connected in shunt across a first part $a$ of the potential divider, means for charging said capacitor in the nonconducting condition of the breakdown element, said breakdown element becoming conductive when the capacitor reaches a given high voltage and remains conducting for some time thereafter at a voltage which is smaller than its breakdown voltage, means for interrupting the current supply of the capacitor in the conducting condition of the breakdown element, second circuit means including a controlled semiconductor switching element connected in shunt with a second part $b$ of the potential divider, means connecting a control electrode of said semiconductor switching element to the first circuit means including divider, means for coupling said energy source to the capacitor so as to supply a charge current for the capacitor when the breakdown element is nonconductive, means responsive to the breakdown element for interrupting the capacitor charge current when the breakdown element conducts, a controlled switching element connected in parallel with a second part of the voltage divider so as to provide a low impedance shunt path across said second part when the switching element conducts, and means connecting a control electrode of the switching element to said to said be breakdown element so that the state of the switching element is determined by the condition of the breakdown element, the voltage distribution across said voltage divider abruptly changing when the switching element changes state.

2. A circuit arrangement as claimed in claim 1 characterized in that the semiconductor switching element is a transistor the control electrode of which is included in the circuit of the breakdown element which shunts the part $a$ of the potential divider.

3. A circuit arrangement as claimed in claim 1 characterized in that the semiconductor switching element is the only circuit element in the shunt across the part $b$ of the potential divider.

4. A circuit as claimed in claim 1 further comprising means for connecting the voltage breakdown element in series with the main current path of the semiconductor switching element so that the switching element is rendered nonconductive when the breakdown element conducts, and vice versa.

5. A circuit as claimed in claim 1 wherein said breakdown element is coupled to the semiconductor switching element so that the switching element is rendered conductive when the breakdown element conducts and vice versa.

6. A power supply comprising, a capacitor, a voltage divider connected in parallel with the capacitor, a source of electric energy, a voltage breakdown element having a given ignition voltage and a lower operating voltage, means connecting a said breakdown element in parallel with a first part of the voltage the breakdown element so that a voltage is produced at the control electrode by means of the first circuit means so as to trigger the semiconductor switching element into conduction as a function of the condition of the breakdown element thereby to change the impedance distribution of the potential divider.

7. A power supply as claimed in claim 6 wherein said voltage divider comprises a plurality of series connected resistors arranged in value so that when the breakdown element ignites and the switching element changes state in response thereto, the voltage distribution is changed in a sense so that the voltage across said first part of the voltage divider drops to a value close to the operating voltage of said breakdown element.

8. A power supply as claimed in claim 6 further comprising means for connecting the voltage breakdown element in series with the main current path of the switching element, said breakdown element being connected to said control electrode to apply a voltage thereto such that conduction in the breakdown element renders the switching element nonconductive, thereby effectively removing said shunt path from across said second part of the voltage divider.

9. A power supply as claimed in claim 6 wherein said energy source comprises, an oscillator circuit, rectifier means coupling the oscillator circuit output to the capacitor, and wherein said current interrupting means includes means for supplying a feedback voltage via said breakdown element to the oscillator circuit to stop oscillations therein when said breakdown element conducts.

10. A power supply as claimed in claim 6 wherein said breakdown element comprises a gas discharge tube, a flash discharge lamp connected across said capacitor, and wherein said gas tube is connected to said control electrode to apply a voltage thereto such tat that conduction in the gas tube causes the switching element to conduct and nonconduction in the gas tube causes nonconduction in the switching element.

PO-1050
(5/69)

UNITED STATES PATENT OFFICE
CERTIFICATE OF CORRECTION

Patent No. 3,569,779   Dated   March 9, 1971

Inventor(s) MEERTEN LUURSEMA

It is certified that error appears in the above-identified patent and that said Letters Patent are hereby corrected as shown below:

Col. 4, Claim 1, lines 68-75 to Col. 5, lines 1-6, cancel an insert as follows: -- circuit means includ the breakdown element so that a voltage is produced at the control electrode by means the first circuit means so as to trigger t semiconductor switching element into condu tion as a function of the condition of the breakdown element thereby to change the impedance distribution of the potential divider. --;

Col. 5, Claim 6, line 28, after "connecting" cancel -- a --;
Col. 5, Claim 6, lines 30-33 to Col. 6, lines 1-2, cancel an insert as follows: -- age divider, means f coupling said energy source to the capacit so as to supply a charge current for the capacitor when the breakdown element is no conductive, means responsive to the breakd element for interrupting the capacitor cha current when the breakdown element conduct a controlled switching element connected i parallel with a second part of the voltage divider so as to provide a low impedance shunt path across said second part when th switching element conducts, and means connecting a control electrode of the swit element to said breakdown element so that state of the switching element is determin by the condition of the breakdown element, voltage distribution across said voltage divider abruptly changing when the switchi element changes state. --;

Signed and sealed this   10th   day   August   1971   .

(SEAL)
Attest:

EDWARD M. FLETCHER, JR.
Attesting Officer

WILLIAM E. SCHUYLER,
Commissioner of Paten

PO-1050
(5/69)

UNITED STATES PATENT OFFICE
CERTIFICATE OF CORRECTION

Patent No. 3,569,779      Dated March 9, 1971

Inventor(s) MEERTEN LUURSEMA

It is certified that error appears in the above-identified patent and that said Letters Patent are hereby corrected as shown below:

Title Page, Col. 1, after line 7 the complete priority information was omitted and therefore please insert as follows: -- Priority     January 17, 1968
                                       Netherlands
                                       6800696 --;

Signed and sealed this 28th day Dec. 19 71.

(SEAL)
Attest:

EDWARD M. FLETCHER, JR.      ROBERT GOTTSCHALK
Attesting Officer                 Acting Commissioner of Patents